April 21, 1931.  J. KAMINSKI  1,801,510
TOOL FOR STRETCHING BRAKE LININGS
Filed Nov. 28 1928
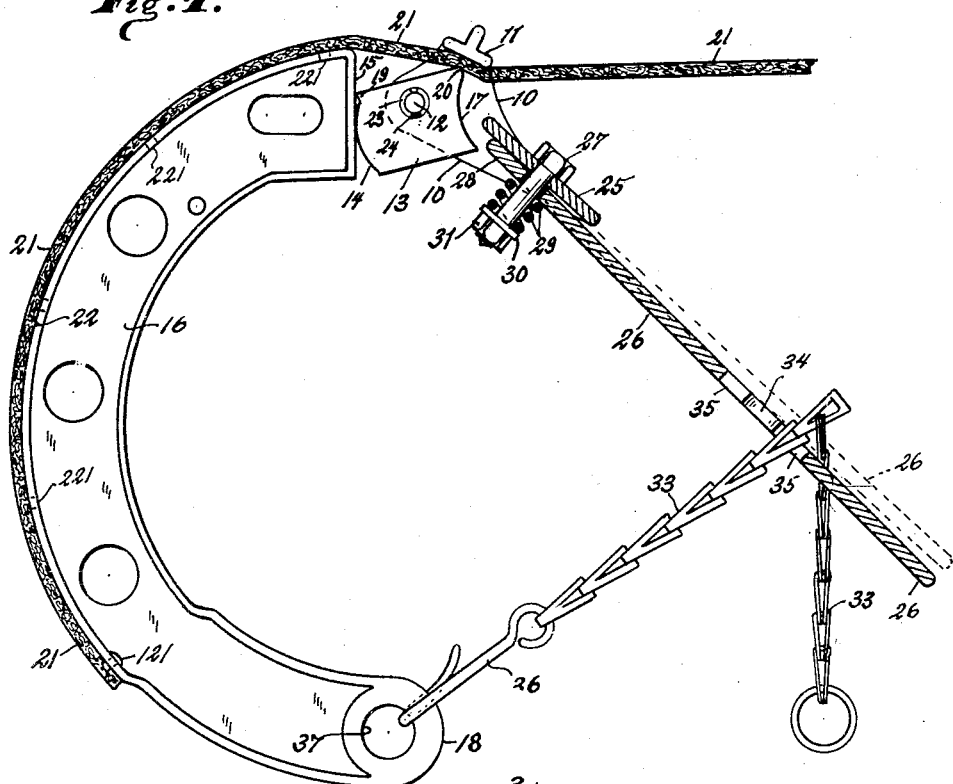
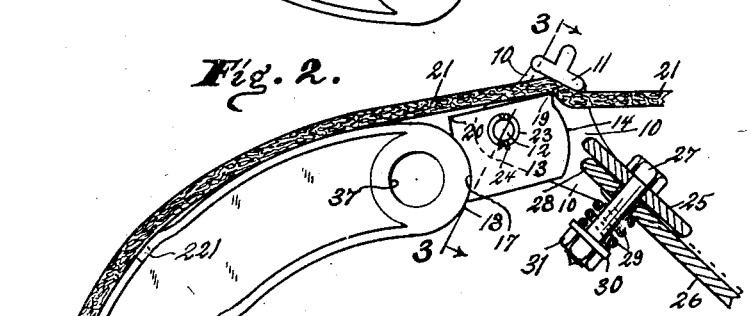
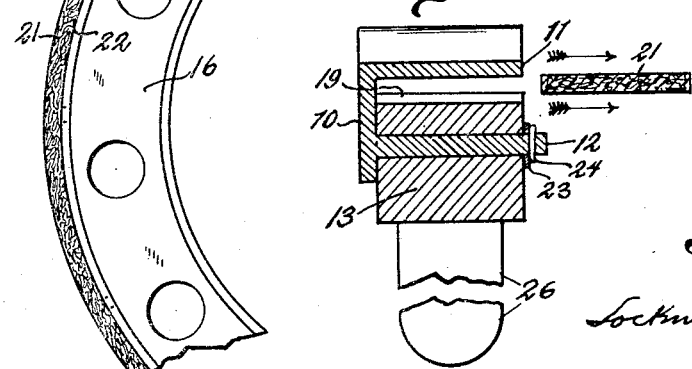
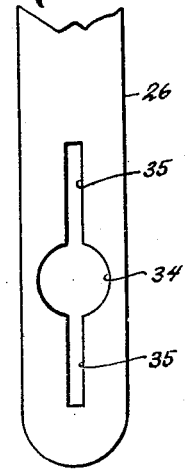
Inventor.
John Kaminski
By Lockwood & Lockwood,
His Attorneys.

Patented Apr. 21, 1931

1,801,510

UNITED STATES PATENT OFFICE

JOHN KAMINSKI, OF PASADENA, CALIFORNIA, ASSIGNOR, BY DIRECT AND MESNE ASSIGNMENTS, TO ROBERT G. WHEELER AND JOHN A. NEWLEE, BOTH OF ALHAMBRA, CALIFORNIA

TOOL FOR STRETCHING BRAKE LININGS

Application filed November 28, 1928. Serial No. 322,526.

This invention relates to means for stretching and holding a brake lining on a brake shoe so it can be riveted in place and when so secured the lining is smooth and even and attached to the shoe without waste of time or material. To that end I provide a tool that can be easily and quickly attached to the lining and then moved to draw it smoothly over the peripheral surface of the shoe and held in stretched position until it can be riveted in place; after which the lining can be cut off from the roll in the right place so as to avoid waste of material.

Another object of the invention is to provide a tool for stretching linings on brake shoes that can be used with any of the standard forms of brake shoes and linings now in use.

As is well known, brake shoes are of various sizes with ends that vary in their formation and also the brake linings are of various widths and thickness; consequently I have constructed my tool so that it can be used with any of the standard shoes in covering them with the linings.

Another object of the invention is to provide a tool that will eliminate arduous labor and also be a great time saver. In other words by use of this tool an ordinary mechanic can replace a brake lining in about one-half the time that has heretofore been required for this purpose and the work can be accomplished without arduous or tedious labor that heretofore has been incident to re-lining brake shoes.

As is well known, time saving in the repair of automobile brake shoes is of great importance to the traveling public, especially where the travelers are delayed by faulty brake linings that must be removed and replaced; consequently one of the objects of the invention is to provide a tool that will avoid unnecessary delay in travel.

A feature of the invention is shown in the construction and mounting of the reversible jaw block whereby the tool can be fitted to the various formed ends of brake shoes.

Features of invention are shown in the construction, combination and arrangement of the parts, whereby a tool for stretching brake linings is provided that is easy to construct, assemble, adjust and operate, that is neat and pleasing in appearance, and which is effective in time saving and durable in use.

Other objects, advantages and features of invention may appear from the accompanying drawing, the subjoined detailed description and the appended claims.

The accompanying drawing illustrates the invention, in which:

Fig. 1 is a side view of a tool for evenly and smoothly tightening brake bands, that is constructed in accordance with this invention, showing it in use at the cam end of the brake shoe and also showing parts broken away and parts in section to more fully illustrate the appliance.

Fig. 2 is a fragmental view of the appliance in use at the pivotal end of the brake shoe; and showing the movable jaw block in reversed position and parts in section.

Fig. 3 is a fragmental section on the line 3—3, Fig. 2, looking in the direction of the arrows and showing the means for reversing the jaw block, also illustrating how the tool is moved into position to engage the brake band which is shown at the side of the tool with the feather tailed arrows indicated that the tool is to be moved sidewise over the band.

Fig. 4 is a plan view of the free end of the lever showing an opening through which the chain fastener can pass freely and slots into which the links of the chain can be passed to hold the lever in a desired position.

The tool includes a head 10, having an upper jaw 11 having one end integral therewith that is arranged transversely to the head. Also arranged at right angles to the head and parallel with the jaw 11 is a pin 12 on which a jaw block 13 is pivotally and reversibly mounted.

This block is provided with a convex end 14, suitable for engaging the flattened or cam end 15 of brake shoes 16, and also a concaved end 17 adapted to engage the rounded or pivotal end 18 of the shoe. That is the ends of this block are formed so as to be fitted to either rounded or flattened ends of the brake shoes now in common use, many of which vary as to form and size.

Also integral with each end of the block 13 are the lower jaws 19 and 20 that coact with the jaw 11 in gripping the brake lining 21 so it can be drawn taut over the peripheral surface 22 of the brake shoe so it can be riveted in place.

It is understood that before the lining is thus stretched it is first secured to the end of the brake shoe by a pair of rivets 121, one of which is shown in Fig. 1. Brake shoes, as is well known, are provided with rivet holes 221 oppositely arranged in the flanges of the shoes for the purpose of securing the brake lining in place.

When the block 13 is arranged so that its convexed end 14 engages the end 15 of the brake shoe the jaw 20 will be in position to coact with the jaw 11; and when the position of the block is reversed the jaw 19 will be in position to engage the lining.

If desired the block 13 can be detachably connected to the pin 12 by a washer 23 and cotter pin 24 or by any other well known means, whereby the position of the block on the pin can be easily and quickly reversed when desirable or necessary.

Also integral with the head 10 is a flange 25 that is arranged centrally and at right angles to the head, and to this flange one end of the lever 26 is movably attached by a bolt 27. That is, the end 28 of the lever 26 is arranged under the flange 25, and the bolt 27 passed through them and the openings through which the bolt passes is sufficiently large to permit the lever to be moved slightly in an arc when pressure is being applied to stretch the lining over the brake shoe.

The end 28 of the lever is held in yielding engagement with the flange 25 by means of a spring 29 that is interposed between the lever 26 and a washer 30 that is held adjustable on the bolt 27 by a nut 31. It is obvious that the tension of the spring 29 can be increased or decreased by means of the nut 31. This arrangement of the parts permits the lever to be moved in an arc independent of the tool head when the limit of stretching the lining is reached, and it is necessary to move the lever still farther in order to secure its free end 32 so as to hold the lining in stretched position.

The means for securing the end 32 of the lever consists of a chain 33 that can freely pass through a large opening 34 in the lever and connected to this opening are slots 35 that are sufficiently large to receive a link of the chain when moved edgewise into the slots but are too small for succeeding links to pass through.

The other end of the chain 33 is provided with a hook 36 adapted to be attached to the end of the brake shoe 16 that is opposite to that engaged by the block 13 of the head 10.

As shown in Fig. 1 the hook 36 is connected to the shoe through the bearing hole 37, and when the tool is reversely arranged as indicated in Fig. 2, the hook can be secured in one of the numerous openings at the other end of the shoe.

In operation one end of the lining 21, which usually comes in large rolls not shown in the drawing, is first riveted to one end or the other of a brake shoe and extended over its peripheral surface 22. Then the tool is placed on the lining opposite to the end of the shoe to which the lining is secured by moving the tool sidewise to the lining so that the latter enters between the tool jaws. Then with the block 13 engaging the end of the brake shoe the lever 26 is moved in an arc toward the other end of the shoe, causing the jaws to grip the lining and draw it taut and smooth over the peripheral surface of the shoe.

When the limit of stretching of the lining is reached the spring 29 permits the lever to be moved further to catch one of the links of the chain 33 in one of the slots 35 to thereby hold the tool in a relatively fixed position and the lining taut until it can be properly secured to the shoe by riveting it in the usual way.

It is understood that in operation the brake shoe while being lined or relined is secured in the usual holding means, such as a vice. The vice is old in the art and is, therefore, not shown in the drawings.

I claim as my invention:

1. A tool for stretching brake linings including a head, an upper jaw integral with said head, a reversible block having concave and convex ends pivotally connected to said head, two lower jaws integral and movable with said block and arranged to coact singly with said upper jaw, and means for moving said head so as to engage a brake lining between said jaws and stretch it taut over the surface of a brake shoe.

2. A tool for stretching brake linings on brake shoes including a head, a jaw integral with said head, a pin secured to said head, a reversible block having concave and convex ends pivotally mounted on said pin, two lower jaws integral and movable with said block, and means including a lever for moving said head so as to engage said jaws with a brake lining between said jaws to stretch it over the peripheral surface of a brake shoe, and means including a chain for holding said tool in engagement with said lining and brake shoe.

3. A tool for stretching a brake lining including a head, an upper jaw having one end integral with said head and arranged transversely thereto, a block having concave and convex ends, a pin on said head on which said block is pivotally mounted, a lower jaw at each end of said block and said block being reversible on said pin so that either of said lower jaws can be arranged to coact with said upper jaw in gripping a brake lining to draw it taut over the peripheral surface of a brake shoe, and a lever yieldingly connected to said head.

4. A tool for stretching a brake lining including a head, an upper jaw having one end integral with said head and arranged transversely thereto, a block having concave and convex ends, a pin arranged parallel with said upper jaw on which said block is pivotally mounted, a lower jaw at each end of said block and said block being reversible on said pin so that either of said lower jaws can be arranged to coact with said upper jaw in gripping a brake lining and drawing it taut over the peripheral surface of a brake shoe, and a lever yieldingly connected to said head for the purpose specified.

5. In a tool for stretching a brake lining the combination of a head, there being a flange integral with said head that is arranged at right angles thereto, a lever having one end fitted under said flange, a yielding connection between said lever and flange, an upper jaw integral with said head, a lower jaw pivotally connected to said head whereby said head can be detachably secured to a brake lining at one end of a brake shoe to draw the lining taut over the shoe, and means connecting said lever with the other end of the brake shoe so as to hold said head in position to hold the brake lining stretched over the peripheral surface of the brake shoe.

6. A tool for stretching a brake lining including a head, there being a flange integral with said head that is arranged at right angles thereto, a lever yieldingly connected to said flange, an upper jaw integral with said head, a pin integral with said head that is arranged parallel to said upper jaw, a lower jaw pivotally mounted on said pin, said jaws arranged so they can be moved sidewise to arrange them in position to engage and grip the brake lining at one end of a brake shoe, and a chain and hook for securing said lever to the other end of a brake shoe to hold said jaws in gripping engagement with the brake lining to hold it taut over the peripheral surface of the brake shoe.

In witness whereof, I have hereunto affixed my signature.

JOHN KAMINSKI.